(12) United States Patent
Chow et al.

(10) Patent No.: US 10,110,307 B2
(45) Date of Patent: Oct. 23, 2018

(54) OPTICAL NETWORK UNITS (ONUS) FOR HIGH BANDWIDTH CONNECTIVITY, AND RELATED COMPONENTS AND METHODS

(75) Inventors: Bruce Cinkai Chow, Brooklyn, NY (US); Anthony Ng'Oma, Horseheads, NY (US); Michael S Pambianchi, Corning, NY (US); Michael Sauer, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 1026 days.

(21) Appl. No.: 13/410,936

(22) Filed: Mar. 2, 2012

(65) Prior Publication Data
US 2013/0230325 A1    Sep. 5, 2013

(51) Int. Cl.
*H04B 10/2575* (2013.01)
*H04Q 11/00* (2006.01)
(Continued)

(52) U.S. Cl.
CPC .......... *H04B 10/25753* (2013.01); *H04J 1/02* (2013.01); *H04L 12/2898* (2013.01); *H04Q 11/0067* (2013.01); *H04Q 11/0071* (2013.01)

(58) Field of Classification Search
CPC ............ H04B 7/0617; H04B 10/25759; H04B 7/0691
(Continued)

(56) References Cited

U.S. PATENT DOCUMENTS 1,280,393 A    10/1918  Cannon
1,703,255 A    2/1929   Wagner
(Continued)

FOREIGN PATENT DOCUMENTS

CN    2893724 Y    4/2007
DE    4130706 A1   3/1993
(Continued)

OTHER PUBLICATIONS

"Digital." Focal Dictionary of Telecommunications, Focal Press. Xerxes Mazda and F.F. Mazda. London: Routledge, 1999.Credo Reference. Web. Feb. 19, 2016.*
(Continued)

*Primary Examiner* — David Payne
*Assistant Examiner* — Tanya Motsinger
(74) *Attorney, Agent, or Firm* — C. Keith Montgomery

(57) ABSTRACT

Optical network units (ONUs) for high bandwidth connectivity, and related components and methods are disclosed. A fiber optical network ends at an ONU, which may communicate with a subscriber unit wirelessly at an extremely high frequency avoiding the need to bury cable on the property of the subscriber. In one embodiment, an optical network unit (ONU) is provided. The ONU comprises a fiber interface configured to communicate with a fiber network. The ONU further comprises an optical/electrical converter configured to receive optical downlink signals at a first frequency from the fiber network through the fiber interface and convert the optical downlink signals to electrical downlink signals. The ONU further comprises electrical circuitry configured to frequency convert electrical downlink signals to extremely high frequency (EHF) downlink signals at an EHF, and a wireless transceiver configured to transmit the EHF downlink signals to a proximate subscriber unit through an antenna.

2 Claims, 9 Drawing Sheets

(51) Int. Cl.
*H04L 12/28* (2006.01)
*H04J 1/02* (2006.01)

(58) Field of Classification Search
USPC .................................................. 398/115–117
See application file for complete search history.

(56) References Cited

U.S. PATENT DOCUMENTS

| | | |
|---|---|---|
| 2,003,147 A | 5/1935 | Holm-Hansen |
| 2,044,073 A | 6/1936 | Hurley |
| 2,131,408 A | 9/1938 | Murrer |
| 2,428,149 A | 9/1947 | Falk |
| 2,681,201 A | 6/1954 | Grunwald |
| 2,984,488 A | 5/1961 | Kirchner |
| 3,054,994 A | 9/1962 | Haram |
| 3,089,915 A | 5/1963 | Plummer |
| 3,204,867 A | 9/1965 | Wahlbom |
| 3,435,124 A | 3/1969 | Channell |
| 3,663,762 A | 5/1972 | Joel, Jr. |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,391,303 A | 7/1983 | Holgersson |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,573,212 A | 2/1986 | Lipsky |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,812,004 A | 3/1989 | Biederstedt et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,939,819 A | 7/1990 | Moyer |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,057,646 A | 10/1991 | Nichols et al. |
| 5,059,927 A | 10/1991 | Cohen |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,210,374 A | 5/1993 | Channell |
| 5,214,395 A * | 5/1993 | Yun .......................... H03B 1/04 330/286 |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,463,186 A | 10/1995 | Schricker |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,579,425 A | 11/1996 | Lampert et al. |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,706,384 A | 1/1998 | Peacock et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,737,475 A | 4/1998 | Regester |
| 5,751,882 A | 5/1998 | Daems et al. |
| 5,758,004 A | 5/1998 | Alarcon et al. |

(56) References Cited

U.S. PATENT DOCUMENTS

| | | |
|---|---|---|
| 5,764,843 A | 6/1998 | Macken et al. |
| 5,774,612 A | 6/1998 | Belenkiy et al. |
| 5,775,648 A | 7/1998 | Metzger |
| 5,777,771 A | 7/1998 | Smith |
| 5,778,132 A | 7/1998 | Csipkes et al. |
| 5,781,678 A | 7/1998 | Sano et al. |
| 5,790,631 A | 8/1998 | Minarczik et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,867,763 A | 2/1999 | Dean et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | Buabbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,351,592 B1 | 2/2002 | Ehn et al. |
| 6,353,696 B1 | 3/2002 | Gordon et al. |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,404,775 B1 | 6/2002 | Leslie et al. |
| 6,411,767 B1 | 6/2002 | Burrous et al. |
| 6,414,624 B2 | 7/2002 | Endo et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,570,913 B1 | 5/2003 | Chen |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B2 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |

(56) References Cited

U.S. PATENT DOCUMENTS

| | | |
|---|---|---|
| 6,674,952 B2 | 1/2004 | Howell et al. |
| 6,710,366 B1 | 3/2004 | Lee et al. |
| 6,711,339 B2 | 3/2004 | Puetz et al. |
| 6,714,800 B2 | 3/2004 | Johnson et al. |
| 6,715,619 B2 | 4/2004 | Kim et al. |
| 6,717,058 B2 | 4/2004 | Booth et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,232 B1 | 3/2005 | Isaksson et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,915,058 B2 | 7/2005 | Pons |
| 6,915,059 B2 | 7/2005 | Daoud et al. |
| 6,915,529 B1 | 7/2005 | Suematsu et al. |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,932,514 B2 | 8/2005 | Anderson et al. |
| 6,934,451 B2 | 8/2005 | Cooke et al. |
| 6,937,807 B2 | 8/2005 | Franklin et al. |
| 6,946,605 B2 | 9/2005 | Levesque et al. |
| 6,946,989 B2 | 9/2005 | Vavik |
| 6,967,347 B2 | 11/2005 | Estes et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,002,511 B1 | 2/2006 | Ammar et al. |
| 7,006,748 B2 | 2/2006 | Dagley et al. |
| 7,027,695 B2 | 4/2006 | Cooke et al. |
| 7,054,513 B2 | 5/2006 | Hertz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 | 10/2006 | Scherer et al. |
| 7,130,519 B2 | 10/2006 | Grubish et al. |
| 7,139,462 B1 | 11/2006 | Richtman |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 * | 2/2007 | Xu .................... H04J 3/14 398/66 |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,011 B2 | 10/2007 | Bayar et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,340,001 B2 | 3/2008 | Smith et al. |
| 7,348,843 B1 | 3/2008 | Qiu et al. |
| 7,349,616 B1 | 3/2008 | Castonguay et al. |
| 7,349,634 B2 | 3/2008 | Sasai et al. |
| 7,369,741 B2 | 5/2008 | Reagan et al. |
| 7,376,325 B1 | 5/2008 | Cloud et al. |
| 7,379,650 B2 | 5/2008 | Weinert et al. |
| 7,379,669 B2 | 5/2008 | Kim .................... 398/74 |
| 7,406,241 B1 | 7/2008 | Opaluch et al. |
| 7,406,242 B1 | 7/2008 | Braga |
| 7,412,145 B2 | 8/2008 | Honma et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,454,222 B2 | 11/2008 | Huang et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,489,641 B2 | 2/2009 | Miller et al. |
| 7,496,269 B1 | 2/2009 | Lee |
| 7,509,016 B2 | 3/2009 | Smith et al. |
| 7,522,805 B2 | 4/2009 | Smith et al. |
| 7,526,174 B2 | 4/2009 | Leon et al. |
| 7,548,680 B2 | 6/2009 | Castonguay et al. |
| 7,565,080 B2 | 7/2009 | Mickelsson et al. ........... 398/58 |
| 7,583,896 B2 | 9/2009 | Taniguchi et al. ............. 398/72 |
| 7,593,704 B2 | 9/2009 | Pinel et al. |
| 7,599,672 B2 | 10/2009 | Shoji et al. |
| 7,609,967 B2 | 10/2009 | Hochbaum et al. |
| 7,613,376 B2 | 11/2009 | Wright et al. |
| 7,623,749 B2 | 11/2009 | Reagan et al. |
| 7,630,608 B2 * | 12/2009 | Gallagher ............ G02B 6/4452 385/135 |
| 7,636,507 B2 | 12/2009 | Lu et al. |
| 7,664,361 B2 | 2/2010 | Trebesch et al. |
| 7,672,591 B2 | 3/2010 | Soto et al. .................... 398/72 |
| 7,690,848 B2 | 4/2010 | Faika et al. |
| 7,697,574 B2 | 4/2010 | Suematsu et al. |
| 7,766,732 B2 | 8/2010 | Hauville |
| 7,769,265 B2 | 8/2010 | Cairns |
| 7,787,823 B2 | 8/2010 | George et al. |
| 7,812,775 B2 | 10/2010 | Babakhani et al. |
| 7,822,310 B2 | 10/2010 | Castonguay et al. |
| 7,826,705 B2 | 11/2010 | McGranahan et al. |
| 7,844,161 B2 | 11/2010 | Reagan et al. |
| 7,880,677 B2 | 2/2011 | Rofougaran et al. |
| 7,881,753 B2 | 2/2011 | Rofougaran |
| 7,889,961 B2 | 2/2011 | Cote et al. |
| 7,912,506 B2 | 3/2011 | Lovberg et al. |
| 7,936,960 B2 | 5/2011 | McGranahan |
| 7,965,837 B2 | 6/2011 | Kawasaki et al. |
| 7,970,249 B2 | 6/2011 | Solheid et al. |
| 7,974,509 B2 | 7/2011 | Smith et al. |
| 8,023,792 B2 | 9/2011 | Ciechomski et al. |
| 8,023,886 B2 | 9/2011 | Rofougaran |
| 8,023,997 B2 | 9/2011 | Hoiness et al. |
| 8,027,656 B2 | 9/2011 | Rofougaran et al. |
| 8,073,329 B2 | 12/2011 | Gao et al. .................... 398/66 |
| 8,086,085 B2 | 12/2011 | Lu et al. |
| 8,107,815 B2 | 1/2012 | Akasaka et al. ............. 398/71 |
| 8,135,257 B2 | 3/2012 | Cooke et al. |
| 8,265,447 B2 | 9/2012 | Loeffelholz et al. |
| 8,280,217 B2 | 10/2012 | Lapp et al. |
| 8,351,754 B2 | 1/2013 | Bell |
| 8,351,792 B2 | 1/2013 | Zheng .................... 398/115 |

(56) References Cited

U.S. PATENT DOCUMENTS

| | | |
|---|---|---|
| 8,374,508 B2 | 2/2013 | Soto et al. .................... 398/115 |
| 8,380,036 B2 | 2/2013 | Smith |
| 8,422,883 B2 | 4/2013 | Yeh et al. .................... 398/115 |
| 8,437,595 B2 | 5/2013 | Womack et al. |
| 8,452,178 B2 | 5/2013 | Gao et al. ..................... 398/66 |
| 8,465,317 B2 | 6/2013 | Gniadek et al. |
| 8,467,651 B2 | 6/2013 | Cao et al. |
| 8,488,966 B2 | 7/2013 | Zheng ............................. 398/72 |
| 8,520,996 B2 | 8/2013 | Cowen et al. |
| 8,599,958 B2 | 12/2013 | Schwarz et al. |
| 8,630,300 B2 | 1/2014 | Edmon |
| 8,660,397 B2 | 2/2014 | Giraud et al. |
| 8,712,206 B2 | 4/2014 | Cooke et al. |
| 8,792,767 B2 | 7/2014 | Fabrykowski et al. |
| 8,798,427 B2 | 8/2014 | Cox et al. |
| 8,879,882 B2 | 11/2014 | Conner et al. |
| 8,909,019 B2 | 12/2014 | Fabrykowski et al. |
| 8,976,670 B2 | 3/2015 | Meier et al. |
| 9,004,778 B2 | 4/2015 | Isenhour et al. |
| 9,049,500 B2 | 6/2015 | Conner et al. |
| 2001/0001270 A1 | 5/2001 | Williams Vigliaturo |
| 2001/0036351 A1 | 11/2001 | Fritz |
| 2002/0012336 A1 | 1/2002 | Hughes et al. |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0128009 A1* | 9/2002 | Boch .................. H04W 88/021 |
| | | 455/426.2 |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0022645 A1 | 1/2003 | Runzo |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0106435 A1 | 6/2004 | Bauman et al. |
| 2004/0109660 A1 | 6/2004 | Liberty |
| 2004/0123998 A1 | 7/2004 | Berglund et al. |
| 2004/0139477 A1 | 7/2004 | Russell et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0196404 A1 | 10/2004 | Loheit et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0058451 A1 | 3/2005 | Ross ................................. 398/70 |
| 2005/0093766 A1* | 5/2005 | Turner ................. H01Q 1/1235 |
| | | 343/900 |
| 2005/0100301 A1 | 5/2005 | Solheid et al. |
| 2005/0114023 A1* | 5/2005 | Williamson ......... G01C 21/165 |
| | | 701/472 |
| 2005/0123261 A1 | 6/2005 | Bellekens et al. |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0207711 A1 | 9/2005 | Vo et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0045524 A1 | 3/2006 | Lee et al. ......................... 398/71 |
| 2006/0049941 A1 | 3/2006 | Hunter et al. |
| 2006/0056327 A1 | 3/2006 | Coersmeier |
| 2006/0067709 A1* | 3/2006 | Newberg ............. H01Q 3/2676 |
| | | 398/188 |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153515 A1 | 7/2006 | Honma et al. |
| 2006/0153516 A1 | 7/2006 | Napiorkowski et al. |
| 2006/0153517 A1* | 7/2006 | Reagan ................ G02B 6/3897 |
| | | 385/135 |
| 2006/0165364 A1 | 7/2006 | Frohlich et al. |
| 2006/0182407 A1 | 8/2006 | Caveney |
| 2006/0182446 A1 | 8/2006 | Kim et al. ........................ 398/72 |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0223439 A1 | 10/2006 | Pinel et al. |
| 2006/0251373 A1 | 11/2006 | Hodge et al. |
| 2006/0253045 A1* | 11/2006 | Coifman ............... A61B 5/0871 |
| | | 600/538 |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0054682 A1 | 3/2007 | Fanning et al. |
| 2007/0093273 A1 | 4/2007 | Cai |
| 2007/0104447 A1 | 5/2007 | Allen |
| 2007/0114339 A1 | 5/2007 | Winchester |
| 2007/0183732 A1 | 8/2007 | Wittmeier et al. |
| 2007/0189691 A1 | 8/2007 | Barth et al. |
| 2007/0224951 A1* | 9/2007 | Gilb ........................ H01Q 3/26 |
| | | 455/127.5 |
| 2007/0261060 A1* | 11/2007 | Manzano .............. G06F 9/4862 |
| | | 719/317 |
| 2007/0263962 A1 | 11/2007 | Kohda |
| 2007/0268846 A1 | 11/2007 | Proctor, Jr. et al. |
| 2007/0274718 A1 | 11/2007 | Bridges et al. |
| 2007/0280619 A1 | 12/2007 | Conner et al. |
| 2007/0292143 A1 | 12/2007 | Yu et al. |
| 2008/0002652 A1 | 1/2008 | Gupta et al. |
| 2008/0008437 A1 | 1/2008 | Reagan et al. |
| 2008/0063350 A1 | 3/2008 | Trebesch et al. |
| 2008/0063397 A1 | 3/2008 | Hu et al. ........................... 398/43 |
| 2008/0085094 A1 | 4/2008 | Krampotich |
| 2008/0124038 A1 | 5/2008 | Kowalczyk et al. |

(56) References Cited

U.S. PATENT DOCUMENTS

| | | |
|---|---|---|
| 2008/0131067 A1 | 6/2008 | Ugolini et al. |
| 2008/0138026 A1 | 6/2008 | Yow et al. |
| 2008/0145008 A1 | 6/2008 | Lewallen et al. |
| 2008/0166094 A1* | 7/2008 | Bookbinder ......... G02B 6/0288 385/124 |
| 2008/0193091 A1 | 8/2008 | Herbst |
| 2008/0205844 A1 | 8/2008 | Castonguay et al. |
| 2008/0224869 A1* | 9/2008 | Kaplan ............... G06K 7/10306 340/572.1 |
| 2008/0225375 A1* | 9/2008 | Newberg ............... G02B 6/122 359/279 |
| 2008/0253723 A1 | 10/2008 | Stokes et al. |
| 2008/0259928 A1 | 10/2008 | Chen et al. |
| 2008/0260389 A1 | 10/2008 | Zheng ............................ 398/115 |
| 2008/0285933 A1 | 11/2008 | Vogel et al. |
| 2008/0292261 A1 | 11/2008 | Kowalczyk et al. |
| 2008/0298743 A1 | 12/2008 | Saravanos et al. |
| 2008/0310464 A1 | 12/2008 | Schneider |
| 2008/0311876 A1 | 12/2008 | Leenaerts et al. |
| 2008/0311944 A1 | 12/2008 | Hansen et al. |
| 2008/0317425 A1 | 12/2008 | Smith et al. |
| 2009/0022470 A1 | 1/2009 | Krampotich |
| 2009/0034929 A1 | 2/2009 | Reinhardt et al. |
| 2009/0047023 A1 | 2/2009 | Pescod et al. |
| 2009/0060440 A1 | 3/2009 | Wright et al. |
| 2009/0060531 A1* | 3/2009 | Biegert ............... H04L 12/2856 398/214 |
| 2009/0074371 A1 | 3/2009 | Bayazit et al. |
| 2009/0081985 A1 | 3/2009 | Rofougaran et al. |
| 2009/0088071 A1 | 4/2009 | Rofougaran |
| 2009/0088072 A1 | 4/2009 | Rofougaran et al. |
| 2009/0097813 A1 | 4/2009 | Hill |
| 2009/0103865 A1 | 4/2009 | Del Rosso |
| 2009/0103878 A1 | 4/2009 | Zimmel |
| 2009/0141780 A1 | 6/2009 | Cruz-Albrecht et al. |
| 2009/0148118 A1 | 6/2009 | Gronvall et al. |
| 2009/0169163 A1* | 7/2009 | Abbott, III ........... G02B 6/0288 385/127 |
| 2009/0208210 A1 | 8/2009 | Trojer et al. |
| 2009/0211171 A1 | 8/2009 | Summers |
| 2009/0237317 A1 | 9/2009 | Rofougaran |
| 2009/0245743 A1 | 10/2009 | Cote et al. |
| 2009/0245746 A1 | 10/2009 | Krampotich et al. |
| 2009/0247109 A1 | 10/2009 | Rofougaran |
| 2009/0252462 A1 | 10/2009 | Bonical |
| 2009/0263122 A1 | 10/2009 | Helkey et al. |
| 2009/0274429 A1 | 11/2009 | Krampotich et al. |
| 2009/0278596 A1 | 11/2009 | Rofougaran et al. |
| 2009/0279593 A1 | 11/2009 | Rofougaran et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0040372 A1* | 2/2010 | Gejrowitz ......... H04B 10/25754 398/71 |
| 2010/0054680 A1 | 3/2010 | Lochkovic et al. |
| 2010/0061693 A1 | 3/2010 | Bran de Leon et al. |
| 2010/0092133 A1 | 4/2010 | Conner |
| 2010/0129030 A1 | 5/2010 | Giraud et al. |
| 2010/0129040 A1 | 5/2010 | Zamzow et al. |
| 2010/0142598 A1 | 6/2010 | Murray et al. |
| 2010/0142955 A1 | 6/2010 | Yu et al. ............................ 398/72 |
| 2010/0144285 A1 | 6/2010 | Behzad et al. |
| 2010/0150556 A1 | 6/2010 | Soto et al. ......................... 398/66 |
| 2010/0150566 A1* | 6/2010 | Soto ..................... H04B 10/272 398/115 |
| 2010/0158525 A1 | 6/2010 | Walter ............................ 398/71 |
| 2010/0159859 A1 | 6/2010 | Rofougaran |
| 2010/0183274 A1 | 7/2010 | Brunet et al. |
| 2010/0189439 A1 | 7/2010 | Novak et al. |
| 2010/0202745 A1 | 8/2010 | Sokolowski et al. |
| 2010/0209066 A1* | 8/2010 | Anderson ............ G02B 6/4452 385/135 |
| 2010/0225520 A1 | 9/2010 | Mohamadi et al. |
| 2010/0239253 A1 | 9/2010 | Lin et al. ........................ 398/63 |
| 2010/0259682 A1 | 10/2010 | Unger |
| 2010/0261501 A1 | 10/2010 | Behzad et al. |
| 2010/0284323 A1 | 11/2010 | Tang et al. |
| 2010/0290753 A1 | 11/2010 | Tang et al. |
| 2010/0303431 A1 | 12/2010 | Cox et al. |
| 2011/0019999 A1 | 1/2011 | George et al. |
| 2011/0026932 A1 | 2/2011 | Yeh et al. |
| 2011/0045767 A1 | 2/2011 | Rofougaran et al. |
| 2011/0052133 A1 | 3/2011 | Simmons et al. |
| 2011/0055875 A1 | 3/2011 | Zussman |
| 2011/0066774 A1 | 3/2011 | Rofougaran |
| 2011/0090942 A1 | 4/2011 | Hardacker et al. |
| 2011/0097052 A1 | 4/2011 | Solheid et al. |
| 2011/0116393 A1 | 5/2011 | Hong et al. |
| 2011/0122912 A1 | 5/2011 | Benjamin et al. |
| 2011/0135307 A1 | 6/2011 | Conner et al. |
| 2011/0139942 A1 | 6/2011 | Moore et al. ..................... 248/58 |
| 2011/0158599 A1 | 6/2011 | Kowalczyk et al. |
| 2011/0206383 A1 | 8/2011 | Chien et al. |
| 2011/0222616 A1 | 9/2011 | Jiang et al. |
| 2011/0222831 A1 | 9/2011 | Cao et al. |
| 2011/0262095 A1 | 10/2011 | Fabrykowski et al. |
| 2011/0262099 A1 | 10/2011 | Castonguay et al. |
| 2011/0268446 A1 | 11/2011 | Cune et al. ..................... 398/79 |
| 2011/0274433 A1* | 11/2011 | Presi ................ H04B 10/25759 398/97 |
| 2012/0093473 A1 | 4/2012 | Cox et al. |
| 2012/0093474 A1 | 4/2012 | Cox et al. |
| 2012/0104145 A1 | 5/2012 | Dagley et al. |
| 2012/0114076 A1* | 5/2012 | Morton ..................... H01P 1/22 375/308 |
| 2012/0257893 A1 | 10/2012 | Boyd et al. ..................... 398/58 |
| 2012/0301096 A1 | 11/2012 | Badar et al. |
| 2012/0308190 A1 | 12/2012 | Smith et al. |
| 2012/0309325 A1* | 12/2012 | Carbone ................. H04B 1/40 455/73 |
| 2013/0016952 A1 | 1/2013 | Knuth |
| 2013/0034333 A1 | 2/2013 | Holmberg et al. |
| 2013/0034335 A1* | 2/2013 | Landry ............... G02B 6/4452 385/135 |
| 2013/0034336 A1 | 2/2013 | Cassell et al. |
| 2013/0106641 A1* | 5/2013 | Warke ................. H04L 27/0014 342/21 |
| 2013/0217336 A1* | 8/2013 | McCormack ......... H04W 8/085 455/41.2 |
| 2013/0295980 A1 | 11/2013 | Reuven et al. |
| 2014/0099064 A1 | 4/2014 | Fabrykowski et al. |
| 2014/0119705 A1 | 5/2014 | Fabrykowski et al. |
| 2014/0153891 A1 | 6/2014 | Ciechomski et al. |
| 2014/0233951 A1 | 8/2014 | Cook |
| 2014/0286643 A1 | 9/2014 | George et al. |
| 2015/0125146 A1 | 5/2015 | Erreygers et al. |

FOREIGN PATENT DOCUMENTS

| | | |
|---|---|---|
| DE | 4133375 C1 | 4/1993 |
| DE | 4240727 C1 | 2/1994 |
| DE | 29800194 U1 | 3/1998 |
| DE | 10005294 A1 | 8/2001 |
| DE | 10238189 A1 | 2/2004 |
| DE | 202004011493 U1 | 9/2004 |
| DE | 20320702 U1 | 10/2005 |
| DE | 202005018884 U1 | 2/2006 |
| DE | 202007000556 U1 | 10/2007 |
| DE | 202007012420 U1 | 10/2007 |
| DE | 202010009385 U1 | 9/2010 |
| EP | 0409390 A2 | 1/1991 |
| EP | 0410622 A2 | 1/1991 |
| EP | 0415647 A2 | 3/1991 |
| EP | 0490644 A1 | 6/1992 |
| EP | 0541820 A1 | 5/1993 |
| EP | 0593927 A1 | 4/1994 |
| EP | 0720322 A2 | 7/1996 |
| EP | 0725468 A1 | 8/1996 |
| EP | 0828356 A2 | 3/1998 |
| EP | 0840153 A2 | 5/1998 |
| EP | 0928053 A2 | 7/1999 |
| EP | 1107031 A1 | 6/2001 |

(56) References Cited

FOREIGN PATENT DOCUMENTS

| | | | |
|---|---|---|---|
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1944635 A2 | 7/2008 | |
| EP | 1944886 A1 | 7/2008 | |
| EP | 2060942 A2 | 5/2009 | |
| EP | 2141527 A2 | 1/2010 | |
| EP | 2180614 A1 | 4/2010 | H04B 10/26 |
| FR | 2123728 A5 | 9/1972 | |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001116968 A | 4/2001 | |
| JP | 200226953 A | 1/2002 | |
| JP | 2004061713 A | 2/2004 | |
| JP | 2009010595 A | 1/2009 | H04B 10/00 |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 9638752 A1 | 12/1996 | |
| WO | 9722025 A1 | 6/1997 | |
| WO | 9725642 A1 | 7/1997 | |
| WO | 9729608 A1 | 8/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | 03093889 A1 | 11/2003 | |
| WO | 2004086112 A1 | 10/2004 | |
| WO | 2005020400 A1 | 3/2005 | |
| WO | 2005050277 A2 | 6/2005 | |
| WO | 2005088373 A1 | 9/2005 | |
| WO | 2005091036 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007089682 A2 | 8/2007 | |
| WO | 2007129953 A1 | 11/2007 | |
| WO | 2008033997 A1 | 3/2008 | |
| WO | 2008048935 A2 | 4/2008 | |
| WO | 2008125217 A1 | 10/2008 | |
| WO | 2008137894 A1 | 11/2008 | |
| WO | 2009029485 A1 | 3/2009 | |
| WO | 2011139942 A1 | 11/2011 | |

OTHER PUBLICATIONS

"Pulse Amplitude Modulation (Pam)." Focal Dictionary of Telecommunications, Focal Press, Xerxes Mazda, and F.F. Mazda, Routledge, 1999. Credo Reference, http://search.credoreference.com/content/entry/bhfidt/pulse_amplitude_modulation_pam/0. Accessed Aug. 9, 2016.*
Yu-Min, Lin et al., "Next Generation OFDMA-based passive optical network architecture supporting radio-over-fiber," IEEE Journal on Selected Areas in Communications, vol. 28, No. 6, Aug. 1, 2010, pp. 791-799.
Koonen, T, "Fiber to the Home/Fiber to the Premises: What, Where, and When?," IEEE, vol. 94, No. 5, May 1, 2006, pp. 911-934.
Patent Cooperation Treaty, International Search Report, dated Jun. 24, 2013, 5 pages.
T. Yoshie, et al.., Advanced Wireless IP Access System (WIPAS) for Fixed Wireless Access (FWA)—Broadband Access Systems for triple place services by "Fiber + Radio",Proceedings of the 19th Annual IEEE Internation Symposium on Personal, Indoor and Mobile Radio Communications (PIMRC '08, 2008.
Y. Kimura, A Low-Cost and Very Compact Wireless Terminal Integrated on the Back of a Waveguide Planar Array for 26 GHz Band Fixed Wireless Access (FWA) Systems, IEEE Transactions on Antennas and Propagation, vol. 53, No. 8, Aug. 2005.
W. Webb, Broadband Fixed Wireless Access as a Key Component of the Future Integrated Communications Environment, IEEE Communications Magazine, Sep. 2001.
Wireless bridge takes high-speed communications to 'last mile', Feb. 28, 2012, Sify.com News.
International Preliminary Report on Patentability for PCT/US2013/038843 dated Nov. 13, 2014, 10 pages.
Author Unknown, "DECT: The standard explained," DECT Forum, Feb. 1997, Solothurn, Switzerland, 16 pages.
Tekmar Sistemi s.r.l., "Definition of Wideband Distribution Systems," R4-020721, TSG-RAN Working Group 4 (Radio), meeting #23, Gyeongju, Korea, May 13-17, 2002, 12 pages.
Chien et al., "Optical Millimeter-Wave Generation and Transmission Without Carrier Suppression for Single and Multi-Band Wireless Over Fiber Applications," Journal of Lightwave Technology, vol. 28, No. 16, Aug. 15, 2010, pp. 2230-2237.
Parker et al., "Radio-over-fiber technologies arising from the Building the future Optical Network in Europe (BONE) project," www.ietdl.org, IET Optoelectronics, 2010, vol. 4, Issue 6, pp. 247-259.
Rappaport et al., "State of the Art in 60-GHz Integrated Circuits and Systems for Wireless Communications,"Proceedings of the IEEE, vol. 99, No. 8, Aug. 2011, pp. 1390-1436.
Singh et al., "Distributed coordination with deaf neighbors: efficient medium access for 60 GHz mesh networks," IEEE INFOCOM 2010 proceedings, 9 pages.
Non-final Office Action for U.S. Appl. No. 12/417,250 dated Jun. 23, 2011, 9 pages.
Final Office Action for U.S. Appl. No. 12/417,250 dated Mar. 3, 2011, 9 pages.
Non-final Office Action for U.S. Appl. No. 12/417,250 dated Jul. 27, 2010, 11 pages.
Advisory Action for U.S. Appl. No. 12/697,628 dated Mar. 1, 2012, 3 pages.
Final Office Action for U.S. Appl. No. 12/697,628 dated Nov. 17, 2011, 15 pages.
Non-final Office Action for U.S. Appl. No. 12/697,628 dated Apr. 6, 2011, 11 pages.
Final Office Action for U.S. Appl. No. 12/630,938 dated Jun. 1, 2012, 18 pages.
Non-final Office Action for U.S. Appl. No. 12/630,938 dated Dec. 19, 2011, 15 pages.
Quayle Action for U.S. Appl. No. 12/861,345 mailed Apr. 9, 2012, 6 pages.
Non-final Office Action for U.S. Appl. No. 12/861,345 dated Dec. 15, 2011, 10 pages.
Non-final Office Action for U.S. Appl. No. 12/700,837 dated Jan. 30, 2012, 7 pages.
Final Office Action for U.S. Appl. No. 12/474,866 dated Jan. 31, 2012, 8 pages.
Non-final Office Action for U.S. Appl. No. 12/474,866 dated Aug. 5, 2011, 9 pages.
International Search Report for PCT/US2009/066779, dated Aug. 27, 2010, 3 pages.
International Search Report for PCT/EP2009/000929, dated Apr. 27, 2009, 4 pages.
Final Office Action for U.S. Appl. No. 12/700,837 dated Aug. 31, 2012, 10 pages.
International Search Report for PCT/US2007/023631, dated Apr. 21, 2008, 2 pages.
International Search Report for PCT/US2008/000095 dated Sep. 12, 2008, 5 pages.
International Search Report for PCT/US2008/002514 dated Aug. 8, 2008, 2 pages.
International Search Report for PCT/US2008/006798 dated Oct. 1, 2008, 2 pages.
Advisory Action for U.S. Appl. No. 12/072,187 dated Aug. 15, 2011, 2 pages.
Final Office Action for U.S. Appl. No. 12/072,187 dated Jun. 13, 2011, 21 pages.
Non-final Office Action for U.S. Appl. No. 12/072,187 dated Nov. 30, 2010, 17 pages.

(56) References Cited

OTHER PUBLICATIONS

Non-final Office Action for U.S. Appl. No. 12/892,280 dated Nov. 6, 2012, 4 pages.
Non-final Office Action for U.S. Appl. No. 13/083,110 dated Dec. 12, 2012, 9 pages.
International Search Report for PCT/US2009/057140 dated Nov. 9, 2009, 2 pages.
Examiners Answer to Appeal Brief for U.S. Appl. No. 12/323,385 mailed Feb. 21, 2013, 11 pages.
Final Office Action for U.S. Appl. No. 12/625,341 dated Feb. 12, 2013, 10 pages.
Advisory Action for U.S. Appl. No. 12/625,341 dated Apr. 25, 2013, 6 pages.
Non-final Office Action for U.S. Appl. No. 12/625,341 dated Oct. 16, 2012, 8 pages.
Non-final Office Action for U.S. Appl. No. 12/323,385 dated Sep. 21, 2011, 10 pages.
Final Office Action for U.S. Appl. No. 12/323,385 dated Mar. 6, 2012, 12 pages.
Final Office Action for U.S. Appl. No. 12/751,860 dated Nov. 5, 2012, 6 pages.
Non-final Office Action for U.S. Appl. No. 12/751,860 dated Jul. 18, 2012, 8 pages.
Final Office Action for U.S. Appl. No. 13/275,798 dated Jun. 27, 2013, 10 pages.
Non-final Office Action for U.S. Appl. No. 13/275,798 dated Mar. 1, 2013, 8 pages.
Final Office Action for U.S. Appl. No. 13/177,233 dated Mar. 29, 2013, 9 pages.
Advisory Action for U.S. Appl. No. 13/177,233 dated Jul. 17, 2013, 3 pages.
Non-final Office Action for U.S. Appl. No. 13/177,233 dated Dec. 17, 2012, 7 pages.
Non-final Office Action for U.S. Appl. No. 10/804,958 dated Jul. 22, 2009, 8 pages.
Final Office Action for U.S. Appl. No. 10/804,958 dated Jun. 11, 2008, 9 pages.
Non-final Office Action for U.S. Appl. No. 10/804,958 dated Aug. 30, 2013, 11 pages.
Notice of Allowance for U.S. Appl. No. 10/804,958 dated May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 dated Oct. 9, 2007, 8 pages.
Non-final Office Action for U.S. Appl. No. 10/804,958 dated Jun. 15, 2007, 7 pages.
Final Office Action for U.S. Appl. No. 10/804,958 dated Nov. 3, 2006, 7 pages.
Non-final Office Action for U.S. Appl. No. 10/804,958 dated Apr. 6, 2006, 7 pages.
Non-final Office Action for U.S. Appl. No. 10/804,958 dated Sep. 21, 2005, 7 pages.
Notice of Allowance for U.S. Appl. No. 11/595,723 dated Dec. 28, 2010, 8 pages.
Non-final Office Action for U.S. Appl. No. 11/595,723 dated Jun. 21, 2010, 9 pages.
Non-final Office Action for U.S. Appl. No. 11/595,723 dated Jan. 5, 2010 9 pages.
Advisory Action for U.S. Appl. No. 11/595,723 dated Nov. 24, 2009, 3 pages.
Final Office Action for U.S. Appl. No. 11/595,723 dated Jul. 8, 2009, 13 pages.
Non-final Office Action for U.S. Appl. No. 11/595,723 dated Sep. 25, 2008, 13 pages.
Final Office Action for U.S. Appl. No. 11/595,723 dated Apr. 11, 2008, 12 pages.
Non-final Office Action for U.S. Appl. No. 11/595,723 dated Jun. 7, 2007 18 pages.
Examiner's Answer to Appeal Brief for U.S. Appl. No. 11/975,440 mailed Oct. 22, 2010, 17 pages.
Final Office Action for U.S. Appl. No. 11/975,440 dated Mar. 8, 2010, 10 pages.
Non-final Office Action for U.S. Appl. No. 11/975,440 dated Oct. 28, 2009, 7 pages.
Non-final Office Action for U.S. Appl. No. 11/975,440 dated Jul. 10, 2009, 6 pages.
Notice of Allowance for U.S. Appl. No. 12/566,191 dated May 24, 2011, 5 pages.
Final Office Action for U.S. Appl. No. 12/566,191 dated Feb. 15, 2011, 8 pages.
Non-Final Office Action for U.S. Appl. No. 12/566,191 dated Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 dated Jul. 1, 2010, 7 pages.
Advisory Action for U.S. Appl. No. 11/499,572 dated Jan. 27, 2010, 3 pages.
Final Office Action for U.S. Appl. No. 11/499,572 dated Aug. 12, 2009, 9 pages.
Advisory Action for U.S. Appl. No. 11/499,572 dated May 29, 2009, 3 pages.
Final Office Action for U.S. Appl. No. 11/499,572 dated Dec. 26, 2008, 8 pages.
Non-final Office Action for U.S. Appl. No. 11/499,572 dated Jun. 13, 2008, 7 pages.
Notice of Allowance for U.S. Appl. No. 12/012,144 dated Feb. 10, 2009, 6 pages.
Non-final Office Action for U.S. Appl. No. 12/012,144 dated Jul. 15, 2008, 5 pages.
Notice of Allowance for U.S. Appl. No. 11/712,168 dated Apr. 21, 2010, 9 pages.
Notice of Allowance for U.S. Appl. No. 11/712,168 dated Sep. 18, 2009, 9 pages.
Notice of Allowance for U.S. Appl. No. 11/712,168 dated Jun. 1, 2009, 7 pages.
Notice of Allowance for U.S. Appl. No. 11/712,168 dated Apr. 7, 2009, 9 pages.
Advisory Action for U.S. Appl. No. 11/712,168 dated Oct. 20, 2008, 3 pages.
Final Office Action for U.S. Appl. No. 11/712,168 dated Jul. 24, 2008, 11 pages.
Non-final Office Action for U.S. Appl. No. 11/712,168 dated Oct. 9, 2007, 7 pages.
Advisory Action for U.S. Appl. No. 11/809,390 dated Dec. 14, 2009, 2 pages.
Final Office Action for U.S. Appl. No. 11/809,390 dated Sep. 25, 2009, 12 pages.
Non-final Office Action for U.S. Appl. No. 11/809,390 dated Mar. 11, 2009, 9 pages.
Notice of Allowance for U.S. Appl. No. 11/809,390 dated Nov. 18, 2008, 7 pages.
Non-final Office Action for U.S. Appl. No. 11/809,390 dated Jul. 25, 2008, 10 pages.
Non-final Office Action for U.S. Appl. No. 11/439,070 dated Jun. 17, 2009, 9 pages.
Non-final Office Action for U.S. Appl. No. 11/439,070 dated Oct. 17, 2008, 13 pages.
Non-final Office Action for U.S. Appl. No. 11/439,070 dated Jan. 11, 2008, 11 pages.
Non-final Office Action for U.S. Appl. No. 11/439,070 dated May 16, 2007, 16 pages.
Final Office Action for U.S. Appl. No. 12/229,810 dated Jun. 9, 2011, 16 pages.
Non-final Office Action for U.S. Appl. No. 12/229,810 dated Dec. 23, 2010, 16 pages.
Final Office Action for U.S. Appl. No. 13/083,110 dated Aug. 5, 2013, 13 pages.

(56) References Cited

OTHER PUBLICATIONS

Notice of Allowance for U.S. Appl. No. 12/417,250 dated Nov. 9, 2011, 8 pages.
Decision on Appeal for U.S. Appl. No. 11/975,440 mailed Nov. 4, 2013, 10 pages.
Advisory Action for U.S. Appl. No. 13/083,110 dated Nov. 12, 2013, 3 pages.
Advisory Action for U.S. Appl. No. 13/275,798 dated Sep. 12, 2013, 2 pages.
Non-Final Office Action for U.S. Appl. No. 13/648,811 dated Oct. 24, 2014, 10 pages.
Non-final Office Action for U.S. Appl. No. 13/601,245 dated Mar. 27, 2014, 8 pages.
Non-final Office Action for U.S. Appl. No. 13/479,846 dated Sep. 13, 2013, 11 pages.
Non-final Office Action for U.S. Appl. No. 13/613,759 dated Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 dated Dec. 26, 2013, 25 pages.
Final Office Action for U.S. Appl. No. 10/804,958 dated Mar. 11, 2014, 13 pages.
Notice of Allowance for U.S. Appl. No. 11/975,440 dated Jan. 15, 2014, 7 pages.
Non-final Office Action for U.S. Appl. No. 13/087,765 dated Sep. 18, 2013, 8 pages.
Final Office Action for U.S. Appl. No. 13/479,846 dated Feb. 14, 2014, 11 pages.
Final Office Action for U.S. Appl. No. 13/613,759 dated Jan. 27, 2014, 13 pages.
Non-final Office Action for U.S. Appl. No. 13/083,110 dated Mar. 18, 2014, 14 pages.
International Search Report for PCT/US2011/030466 dated Aug. 5, 2011, 4 pages.
Non-final Office Action for U.S. Appl. No. 13/094,572 dated Jan. 18, 2013, 17 pages.
Final Office Action for U.S. Appl. No. 13/094,572 dated Jul. 8, 2013, 13 pages.
Advisory Action for U.S. Appl. No. 13/094,572 dated Oct. 7, 2013, 2 pages.
Non-final Office Action for U.S. Appl. No. 13/094,572 dated Mar. 4, 2014, 14 pages.
Advisory Action for U.S. Appl. No. 13/613,759 dated Apr. 7, 2014, 3 pages.
Non-final Office Action for U.S. Appl. No. 13/649,377 dated Jan. 31, 2014, 5 pages.
International Search Report for PCT/US2011/030446 dated Jul. 14, 2011, 3 pages.
International Search Report for PCT/US2011/030448 dated Jul. 20, 2011, 5 pages.
Advisory Action for U.S. Appl. No. 10/804,958 dated Jun. 26, 2014, 4 pages.
Notice of Allowance for U.S. Appl. No. 11/975,440 dated Apr. 30, 2014, 8 pages.
Final Office Action for U.S. Appl. No. 12/072,187 dated May 27, 2014, 27 pages.
Non-final Office Action for U.S. Appl. No. 13/089,692 dated Jan. 13, 2014, 8 pages.
Non-final Office Action for U.S. Appl. No. 13/089,692 dated May 5, 2014, 7 pages.
Final Office Action for U.S. Appl. No. 13/089,692 dated Aug. 13, 2014, 8 pages.
Advisory Action for U.S. Appl. No. 13/089,692 dated Oct. 22, 2014, 2 pages.
Notice of Allowance and Interview Summary for U.S. Appl. No. 13/094,572 dated Aug. 7, 2014, 11 pages.
Examiner's Answer to the Appeal Brief for U.S. Appl. No. 13/275,798 mailed Aug. 26, 2014, 6 pages.
Advisory Action for U.S. Appl. No. 13/479,846 dated May 8, 2014, 3 pages.
Non-final Office Action for U.S. Appl. No. 13/537,753 dated Mar. 27, 2014, 7 pages.
Notice of Allowance for U.S. Appl. No. 13/537,753 dated Aug. 21, 2014, 7 pages.
Examiner's Answer to the Appeal Brief for U.S. Appl. No. 13/613,759 mailed Aug. 18, 2014, 6 pages.
Final Office Action for U.S. Appl. No. 13/649,377 dated May 29, 2014, 8 pages.
Non-final Office Action for U.S. Appl. No. 14/093,636 dated Oct. 10, 2014, 6 pages.
Non-final Office Action for U.S. Appl. No. 13/275,842 dated Nov. 13, 2013, 7 pages.
Final Office Action for U.S. Appl. No. 13/275,842 dated Aug. 28, 2014, 20 pages.
Examiner's Answer to the Appeal Brief for U.S. Appl. No. 12/072,187 mailed Dec. 19, 2014, 25 pages.
Final Office Action for U.S. Appl. No. 13/083,110 dated Nov. 7, 2014, 20 pages.
Non-Final Office Action for U.S. Appl. No. 13/362,474 dated Dec. 5, 2014, 8 pages.
Non-Final Office Action for U.S. Appl. No. 13/089,692 dated Dec. 2, 2014, 7 pages.
Notice of Allowance for U.S. Appl. No. 13/537,753 dated Dec. 12, 2014, 7 pages.
Advisory Action for U.S. Appl. No. 13/275,842 dated Nov. 20, 2014, 3 pages.
Examiner's Answer to the Appeal Brief for U.S. Appl. No. 10/804,958 mailed Mar. 6, 2015, 8 pages.
Decision on Appeal for U.S. Appl. No. 12/323,385 mailed Apr. 1, 2015, 6 pages.
Advisory Action for U.S. Appl. No. 13/083,110 dated Jan. 30, 2015, 3 pages.
Non-final Office Action for U.S. Appl. No. 13/083,110 dated Mar. 4, 2015, 17 pages.
Final Office Action for U.S. Appl. No. 13/089,692 dated Mar. 12, 2015, 7 pages.
Non-final Office Action for U.S. Appl. No. 13/479,846 dated Mar. 19, 2015, 14 pages.
International Preliminary Report on Patentability for PCT/US2013/028493 dated Sep. 12, 2014, 7 pages.
International Search Report for PCT/US2013/038843 dated Jul. 18, 2013, 4 pages.
Notice of Allowance for U.S. Appl. No. 13/083,110 dated Nov. 25, 2015, 10 pages.
Non-final Office Action for U.S. Appl. No. 13/089,692 dated Jan. 14, 2016, 8 pages.
Final Office Action for U.S. Appl. No. 13/479,846 dated Jan. 4, 2016, 15 pages.
Final Office Action for U.S. Appl. No. 13/275,842 dated Nov. 13, 2015, 24 pages.
Non-final Office Action for U.S. Appl. No. 14/947,187 dated Feb. 2, 2016, 12 pages.
Final Office Action for U.S. Appl. No. 13/873,927 dated Feb. 8, 2016, 24 pages.
Notice of Allowance for U.S. Appl. No. 12/323,385 dated Jul. 24, 2015, 8 pages.
Final Office Action for U.S. Appl. No. 14/093,636 dated May 22, 2015, 9 pages.
Non-final Office Action for U.S. Appl. No. 14/300,541 dated May 6, 2015, 8 pages.
Final Office Action for U.S. Appl. No. 13/648,811 dated Jun. 9, 2015, 19 pages.
Notice of Allowance and Applicant-Initiated Interview Summary for U.S. Appl. No. 14/300,541 dated Aug. 28, 2015, 10 pages.
Non-final Office Action for U.S. Appl. No. 13/275,842 dated Apr. 28, 2015, 21 pages.
Non-final Office Action for U.S. Appl. No. 13/873,927 dated Aug. 14, 2015, 19 pages.
European Search Report for European Patent Application No. 08877225.6 dated Jan. 5, 2015, 5 pages.

(56) References Cited

OTHER PUBLICATIONS

Examination Report for European Patent Application No. 13726908.0, dated Sep. 9, 2015, 6 pages.
Third Office Action for Chinese Patent Application No. 200880131932.2 dated Jun. 10, 2014, 17 pages.
Mohamed et al., "Millimeter-Wave Carrier Generation System for Radio over Fiber," International Symposium on High Capacity Optical Networks and Enabling Technologies, Nov. 18-20, 2008, Penang, Malaysia, IEEE, pp. 111-115.
Advisory Action for U.S. Appl. No. 13/873,927 dated Apr. 14, 2016, 3 pages.
Non-final Office Action for U.S. Appl. No. 13/873,927 dated May 12, 2016, 23 pages.
Decision on Appeal for U.S. Appl. No. 13/613,759 mailed Jun. 30, 2016, 13 pages.
Non-final Office Action for U.S. Appl. No. 13/275,842 dated Jun. 7, 2016, 11 pages.
Final Office Action for U.S. Appl. No. 14/947,187 dated Aug. 5, 2016, 9 pages.

\* cited by examiner

OPTICAL NETWORK UNITS (ONUS) FOR HIGH BANDWIDTH CONNECTIVITY, AND RELATED COMPONENTS AND METHODS

BACKGROUND

Field of the Disclosure

The technology of the disclosure relates to providing high bandwidth connections to subscriber facilities.

Technical Background

The internet is evolving in response to perceived demands on it from both consumers and content providers. The consumers are perceived to desire the ability to download audio and video content without degradation of the content from compression or the like. This desire results in a perceived demand for greater bandwidth. Similarly, content providers have a desire to be able to charge for content delivered to a consumer when the consumer requests the content (i.e. "on demand" video). Such content delivery is bandwidth intensive. Thus, both sides of the consumer-provider relationship have a perceived desire for greater bandwidth.

The advent of streaming high definition video has only exacerbated this demand. Current twisted wire solutions are not capable of providing the bandwidth necessary to provide the desired content at the desired quality levels. While coaxial cable solutions initially offered the promise of being able to provide desired bandwidth, as more subscribers use the cable network, the available bandwidth has to be shared between these subscribers, resulting in unacceptable degradation of quality. Similarly, while satellite based systems have offered large downlink bandwidths, uplink bandwidths have proven relatively narrow or require a terrestrial based uplink. Additionally, satellite systems sometimes exhibit the more serious problem of long latency. Neither solution is attractive and relegates the satellite systems to a marginally acceptable solution.

Communication networks using optical fiber as the primary uplink and downlink media have proven capable of accommodating the heavy bandwidth requirements. However, fiber optical networks have not seen widespread deployment beyond central office to central office connection. Occasionally, the optical fiber network has been extended to a community head end or other remote location, but individual subscribers still rely on copper solutions to provide service from the head end or remote location to the subscriber unit. Expense and inconvenience of providing buried fiber optical cables from the head end or remote location to the subscriber unit have slowed further expansion of the fiber optical network. Thus, to date, fiber to the house (FTTH) has not been realized, and subscribers are still perceived to desire streamed high definition quality video.

SUMMARY OF THE DETAILED DESCRIPTION

Embodiments disclosed herein include optical network units (ONUs) for high bandwidth connectivity. Related components and methods are also disclosed including subscriber units and systems. The systems may include both ONUs and subscriber units. A fiber optical network ends at an ONU, which may communicate with a subscriber unit wirelessly at an extremely high frequency avoiding the need to bury cable on the property of the subscriber.

In this regard, in one embodiment, an optical network unit (ONU) is provided. The ONU comprises an optical fiber interface configured to communicate with a fiber network. The ONU further comprises an optical/electrical converter configured to receive optical downlink signals at a first frequency from the fiber network through the fiber interface and convert the optical downlink signals to electrical downlink signals. The ONU further comprises electrical circuitry configured to frequency convert the electrical downlink signals to extremely high frequency (EHF) downlink signals at an EHF and a wireless transceiver configured to transmit the EHF downlink signals to a proximate subscriber unit through an antenna.

In another embodiment, a method of operating an ONU is provided. The method comprises communicating with a fiber network via a fiber interface and receiving, at an optical/electrical converter, optical downlink signals at a first frequency from the fiber network through the fiber interface. The method further comprises converting, at the optical/electrical converter, the optical downlink signals to electrical downlink signals and frequency converting the electrical downlink signals to extremely high frequency (EHF) downlink signals at an EHF. The method further comprises transmitting the EHF downlink signals to a proximate subscriber unit through an antenna.

In another embodiment, a subscriber unit is provided. The subscriber unit comprises an antenna configured to operate at an extremely high frequency (EHF) range and a transceiver configured to transmit EHF uplink signals to a proximate optical network unit (ONU) for transmission over a fiber network, the transceiver further configured to receive EHF downlink signals from the ONU.

In another embodiment a system is provided. The system comprises an ONU and a subscriber unit. The ONU comprises a fiber interface configured to communicate with a fiber network and an optical/electrical converter configured to receive optical downlink signals at a first frequency from the fiber network through the fiber interface and convert the optical downlink signals to electrical downlink signals. The ONU further comprises electrical circuitry configured to frequency convert the electrical downlink signals to extremely high frequency (EHF) downlink signals at an EHF and a wireless transceiver configured to transmit the EHF downlink signals to a proximate subscriber unit through an ONU antenna. The subscriber unit comprises a subscriber antenna configured to operate at an EHF range and a transceiver configured to receive the EHF downlink signals from the ONU.

As non-limiting examples, the extremely high frequency may be approximately 60 GHz and various techniques such as frequency division multiplexing and polarization selection may be used to reduce interference between subscriber units. While the text of the present disclosure may initially address the downlink, it should be appreciated that the disclosure is not so limited and the teachings also apply to the uplink. In particular, the uplink may also occur in the EHF range and use the various antenna techniques and beam steering techniques to help reduce interference.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include optical network units (ONUs) for high bandwidth connectivity. Related components and methods are also disclosed including subscriber units and systems. The systems include ONUs and subscriber units. A fiber optical network ends at an ONU, which may communicate with a subscriber unit wirelessly at an extremely high frequency avoiding the need to bury cable on the property of the subscriber.

Figure 1:
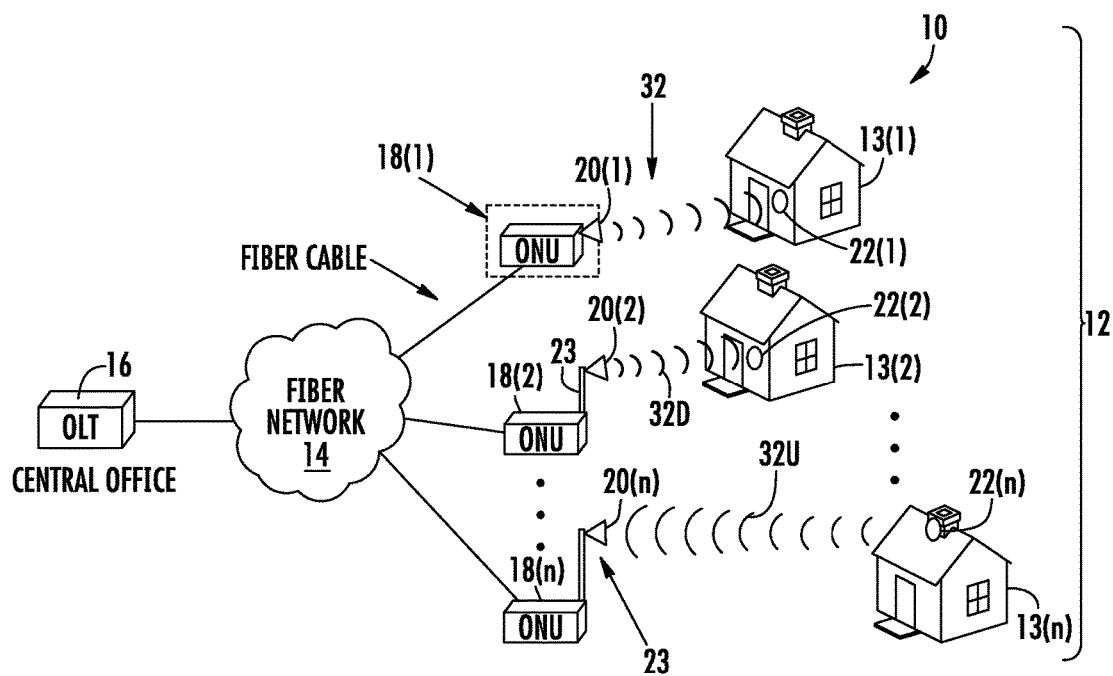
FIG. 1 is simplified diagram of an exemplary fiber network that extends to a street side optical network unit wirelessly communicating with a subscriber unit.

In this regard, FIG. 1 illustrates an exemplary communication system 10 with a neighborhood 12 of subscriber units 13(1)-13(N) served by fiber network 14. The fiber network 14 communicatively couples a central office 16 with one or more ONUs 18(1)-18(N). As is well understood, each ONU 18 may include an optical fiber interface configured to couple the ONU 18 to the fiber network 14 and communicate therewith. That is, the optical fiber interface receives optical downlink signals from the fiber network 14 and sends optical uplink signals from the ONU 18. The optical downlink signals are received at a first frequency. The central office 16 and fiber network 14 may be conventional and may include head end units and other components that are not specifically illustrated but understood in the industry. The subscriber units 13(1)-13(N) may be residential houses, multi-dwelling units, commercial properties, or the like.

With continuing reference to FIG. 1, each ONU 18(1)-18(N) includes an antenna 20(1)-20(N) which wirelessly communicates via wireless link 32 with a corresponding subscriber antenna 22(1)-22(N) at the subscriber unit 13(1)-13(N). Where, relevant, the ONU 18 to subscriber unit 13 link is called the wireless downlink 32D, and the subscriber unit 13 to ONU 18 link is called the wireless uplink 32U otherwise the collective wireless link 32 is used. While FIG. 1 is not intended to be to scale, it should be appreciated that FIG. 1 illustrates that the subscriber antennas 22(1)-22(N) may be at different heights or positions on the subscriber unit 13(1)-13(N) and the antennas 20(1)-20(N) may be positioned on a mast 23 so as to effectuate wireless communications more effectively. In another exemplary embodiment, the antennas 20 may be associated with utility poles or other existing utility structures as desired.

In an exemplary embodiment, the ONUs 18(1)-18(N) communicate with the subscriber unit 13(1)-13(N) using an extremely high frequency (EHF) wireless signal. As used herein, the EHF band ranges from about 30 GHz to about 300 GHz. In a further exemplary embodiment, the communication occurs at approximately 60 GHz (e.g., millimeter wave) in channels having about a seven GHz bandwidth. In the United States, the band 38.6-40.0 GHz is used for licensed high-speed microwave data links, and the 60 GHz band can be used for unlicensed short range (1.7 km) data links with data throughputs in excess of 28 Gbit/s while the video standard allows for approximately 5 Gbit/s. The 71-76, 81-86 and 92-95 GHz bands are also used for point-to-point high-bandwidth communication links. These frequencies, as opposed to the 60 GHz frequency, require a transmitting license in the US from the Federal Communications Commission (FCC), though they do not suffer from the effects of oxygen absorption as the 60 GHz does.

As a non-limiting example, by terminating the fiber portion of the communication system 10 at the ONU 18, there is no need to dig or trench in the subscriber's property, and thus, there is no need to secure permission to bury cable all the way to the subscriber unit 13. Likewise, the expense of burying the cable is avoided. Instead of carrying cable all the way to the subscriber unit 13, the wireless link 32 creates a high bandwidth communication link that carries EHF downlink signals to the subscriber unit 13 and receives EHF uplink signals from the subscriber unit 13.

Figure 2A:
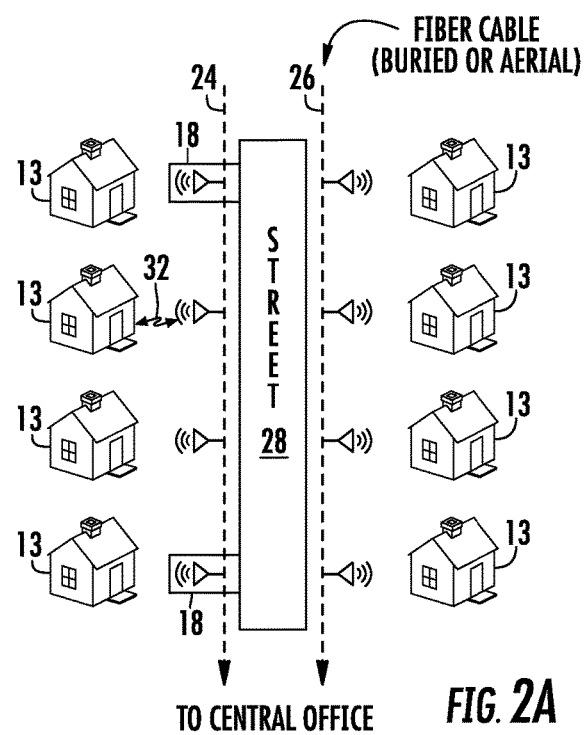
FIG. 2A is simplified diagram of an exemplary neighborhood of subscriber units, each serviced wirelessly by optical network units.
Figure 2B:
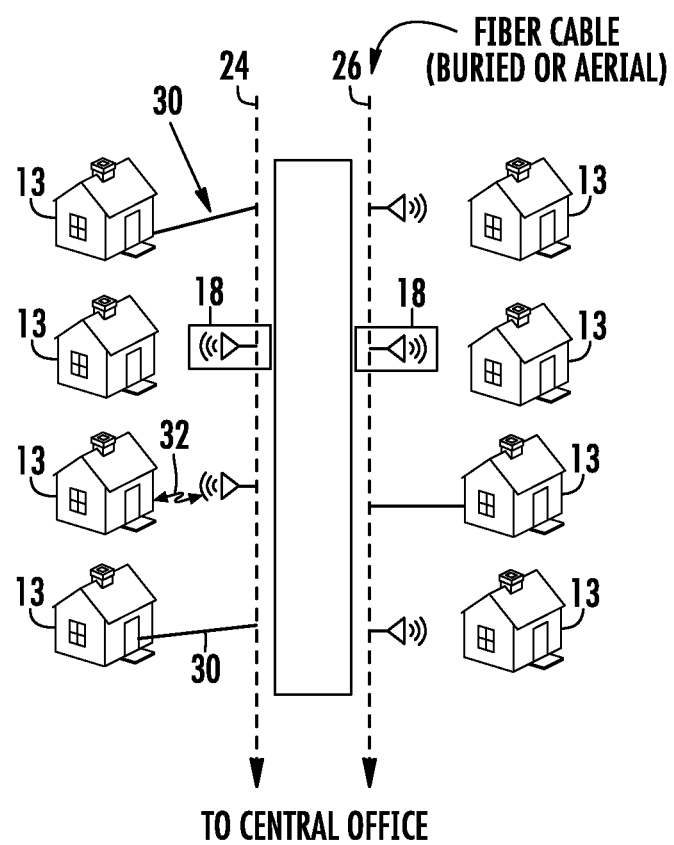
FIG. 2B is a simplified diagram of an exemplary hybrid neighborhood wherein some subscriber units are wirelessly serviced and some have fiber to the subscriber unit.

FIGS. 2A and 2B illustrate two exemplary embodiments of the communication system 10. In FIG. 2A, cables 24, 26 run on either side of a street 28. While described as a street, a road, highway, interstate, sidewalk, or other public right of way with appurtenant existing easements is considered equivalent. A respective ONU 18 is coupled to one of the cables 24, 26 for each subscriber unit 13. Thus, each subscriber unit 13 is served by a respective wireless link 32. The exemplary embodiment of FIG. 2A is appropriate where the utility company is unable or unwilling to secure permission or unwilling to undertake the expense of trenching cable all the way to the subscriber units 13. FIG. 2B illustrates a mixed communication system 10A where some subscribers have consented to and/or requested that cable be run all the way to the subscriber unit 13. In the embodiment of FIG. 2B, subscriber units 13A are served directly by fiber optical cables 30 rather than wireless link 32. However, other subscriber units 13 are still served by wireless links 32. The present disclosure works in both homogenous wireless systems and heterogeneous wired/wireless systems and is not limited to strictly wireless systems.

Figure 3:
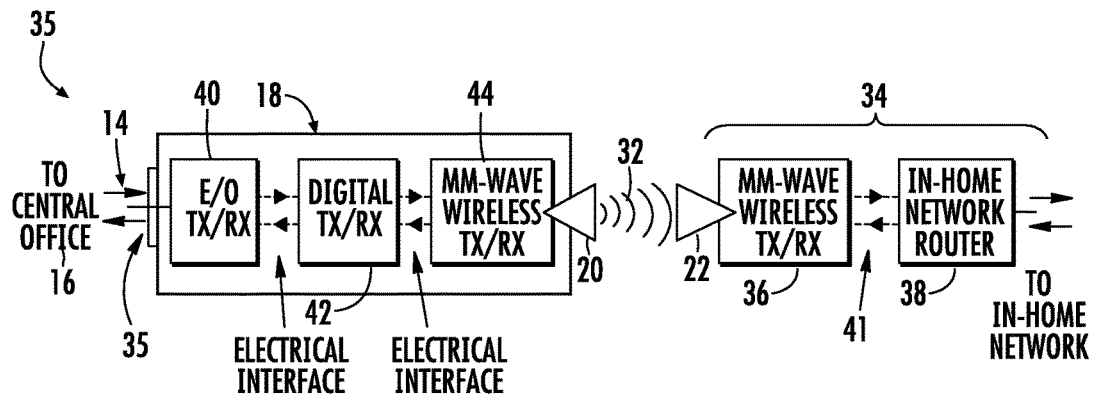
FIG. 3 is a simplified block diagram of an optical network unit and subscriber unit hardware.

FIG. 3 illustrates an exemplary ONU 18 (also sometimes referred to herein as a street node 18), wireless link 32, and the subscriber hardware 34, collectively subscriber module 35. The subscriber hardware 34 may include the subscriber antenna 22, a wireless transceiver 36, and an in-home network router 38. The wireless transceiver 36 may be connected to the in-home network router 38 through an appropriate conventional electrical interface 41. In an exemplary embodiment, the wireless transceiver 36 is a mm-wave wireless transceiver. It should be appreciated that once signals reach the in-home network router 38, the signals may be retransmitted over wires such as CAT5 or CAT6 wires, wirelessly such as through a WIFI, BLUETOOTH or other system as is well understood so that computers, televisions, and other appliances may be used as desired.

With continuing reference to FIG. 3, the ONU 18 includes an optical fiber interface 39 (sometimes referred to herein as a "fiber interface") configured to couple the ONU 18 to the fiber network 14 and allow communication therewith. The ONU 18 further includes an electrical/optical converter and transceiver 40, which is configured to convert optical downlink signals from the fiber network 14 to downlink electrical signals and convert electrical uplink signals to optical uplink signals for transmission on the fiber network 14. As noted above, the fiber network 14 is a high bandwidth network that offers the high bandwidth in both the downlink and the uplink directions and does not suffer from bandwidth degradation when additional subscribers are added.

With continuing reference to FIG. 3, The ONU 18 further includes digital and/or electrical circuitry 42 which is configured to condition the electrical signals, perform any frequency conversion thereon as needed, and/or provide any desired digital signal processing. In an exemplary embodiment, the electrical downlink signals from the transceiver 40 are converted to an EHF downlink signal. The ONU 18 further includes a wireless transceiver 44 configured to transmit the EHF downlink signals through the antenna 20 to the subscriber unit 13 and receive EHF uplink signals from the subscriber unit 13 through the antenna 20. EHF uplink signals may be passed to the electrical circuitry 42, which may convert the EHF uplink signals to an intermediate frequency (IF) electrical uplink signal. Alternatively, the electrical circuitry 42 may convert the signal to a digital baseband signal if desired. In an exemplary embodiment, the wireless transceiver 44 is a mm-wave wireless transceiver. As noted above, an EHF signal is a high bandwidth signal that performs well over distances under two km where line of sight transmission is available. In the event that the optical downlink signal is not in the EHF range, the electrical circuitry 42 converts the electrical downlink signal to the desired EHF range. Alternatively, the optical downlink signal may be a purely digital signal, in which case the electrical circuitry 42 may merely condition the signal and up-convert the signal to the desired EHF range.

Figure 4:
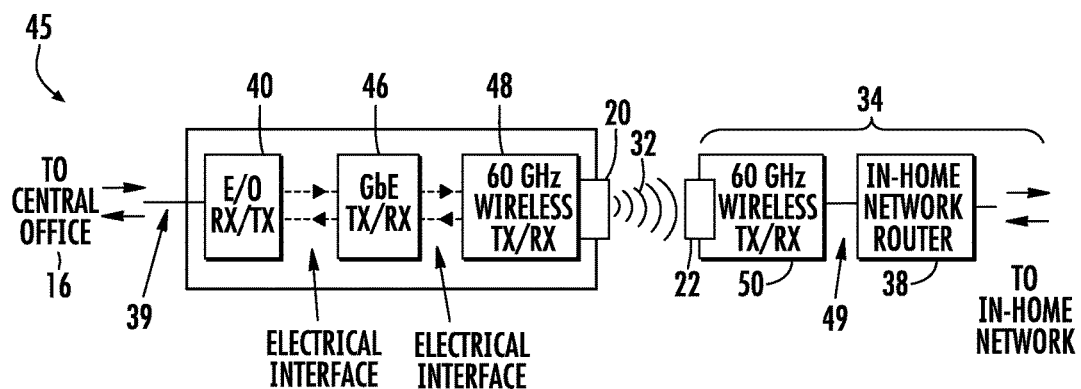
FIG. 4 is a more detailed exemplary embodiment of FIG. 3, operating at 60 GHz.

Subscriber module 35 of FIG. 3 is a relatively high level presentation of the components of the subscriber module 35. In contrast to the high level presentation of FIG. 3, FIG. 4 offers a slightly more detailed exemplary embodiment of a subscriber module 45. The ONU 18 includes an electrical/optical converter and transceiver 40 as before, but the digital circuitry 42 is more specifically a digital signal processor (DSP) and a Gigabit-Ethernet (GbE) transceiver 46, and the wireless transceiver 44 is more specifically a 60 GHz transceiver 48. Similarly, the subscriber hardware 34 includes a 60 GHz wireless transceiver 50 and the electrical interface 41 is more accurately a CAT6 cable 49. This embodiment is appropriate if the fiber network 14 operates according to a Gigabit-Ethernet protocol and the DSP allows logical (protocol-level) termination of the optical network and the re-coding of the signal in preparation for frequency up conversion to the EHF range for transmission by the 60 GHz transceiver 48. Using a transceiver with a given protocol (such as GbE or 10 GbE or the like) in the ONU 18 allows the ONU 18 to be remotely addressable for control and management purposes. Likewise, having the DSP capability in the ONU 18 allows for remote programming of each individual ONU 18(1)-18(N) as well as allow for protocol translation (e.g., converting the GbE protocol to a different protocol suited for 60 GHz transmission and vice versa). Such flexibility comes at the cost of increased hardware expense, but certain implementations may justify this tradeoff and are considered within the scope of the present disclosure.

Figure 5:
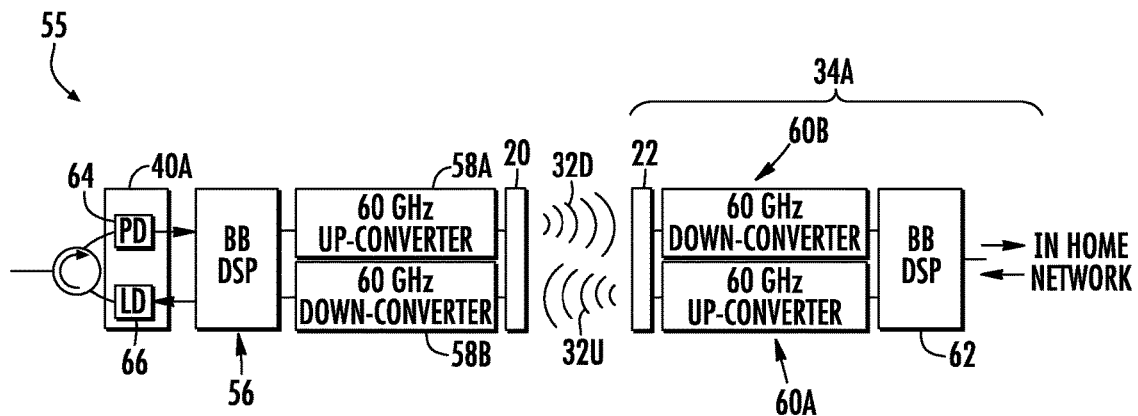
FIG. 5 is an even more detailed exemplary embodiment of FIG. 3, with particular exemplary optical/electrical components illustrated.

FIG. 5 provides a more detailed version of an exemplary subscriber module, and in particular illustrates subscriber module 55. In subscriber module 55, the ONU 18 includes an electrical/optical converter 40A, which is formed from a photodiode (PD) 64 to convert optical downlink signals to electrical downlink signals and a laser diode (LD) 66 to convert electrical uplink signals to optical uplink signals. The digital circuitry 42 specifically includes a baseband DSP 56. The wireless transceiver 44 more specifically includes a 60 GHz frequency up-converter 58A to convert the electrical downlink signals from the baseband DSP 56 to approximately 60 GHz wireless downlink signal and a 60 GHz down-converter 58B to convert the EHF uplink signal to a baseband electrical uplink signal. Likewise, the subscriber hardware 34A includes a frequency up-converter 60A and a frequency down-converter 60B to convert uplink and downlink signals respectively. The subscriber hardware 34A further includes a baseband DSP 62 for further manipulation of uplink and downlink signals. In an exemplary embodiment, the antenna 20 may be a patch antenna array.

Figure 6:
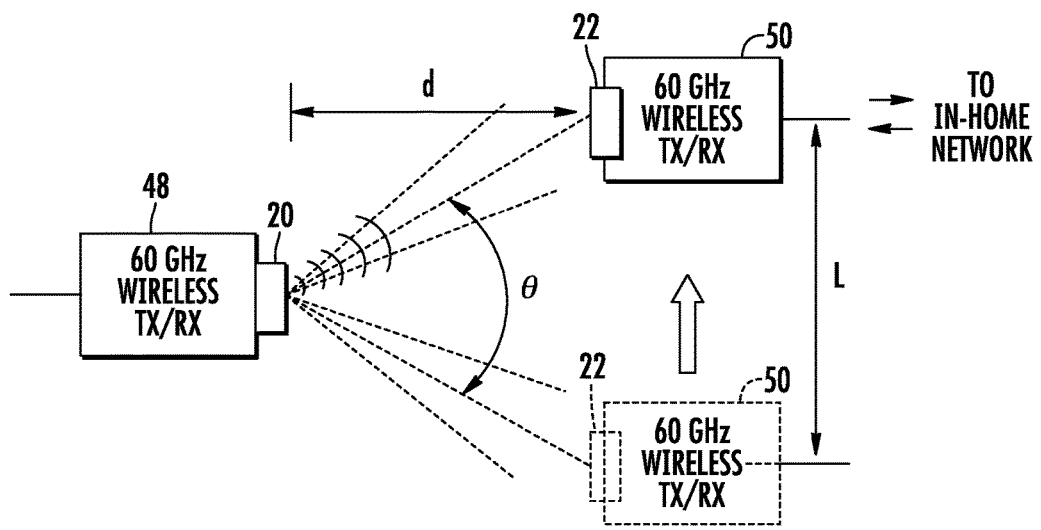
FIG. 6 is an exemplary embodiment of beam steering technology that may be used by certain embodiments of the present disclosure.

FIG. 6 illustrates an exemplary antenna 20 suitable for use with the present disclosure. In particular, the antenna 20 may be a beam forming or beam steering antenna. Use of a beam steering antenna allows for easy installation of the antenna 20 and the subscriber antenna 22 so long as line of sight is available between both antennas. In one example, the minimum placement offset (perpendicular) range in one plane is given by $L=2d*\tan(\theta/2)$ for maximum link gain, where $\theta$ and d represent the maximum beam steering angle of the antennas and the distance between the two antennas respectively. Thus, the wireless transceivers and antennas may be placed without precise angular alignment and still be able to establish a best case line of sight link. In an exemplary embodiment, auto-alignment algorithms may be implemented in a DSP module (e.g., DSP 56) or an integrated DSP sub-module (not illustrated). The beam steering may be used at frequencies other than the 60 GHz illustrated.

While use of the wireless link 32 allows network connection providers to eliminate the need for extending fiber optical cable (or other physical medium) to the subscriber unit 13, the use of the wireless link 32 may present other factors. One relevant factor that can arise by use of the wireless line 32 is possible interference between different ONUs 18 and subscriber units 13. That is, proximate ONUs 18 and subscriber units 13 may send signals that are inadvertently received by other elements in the network. This inadvertent reception may be conceptualized as a form of undesirable crosstalk. A simple illustration of interference is provided with reference to FIG. 7, where ONU 18A may transmit a signal 70A that is received by ONU 18B and ONU 18B transmits a signal 70B that is received by ONU 18A. While beam steering can avoid or reduce some inadvertent mutual interference, physical proximity of subscriber units 13 may not make it possible to completely eliminate interference with beam steering. The present disclosure provides additional solutions below. The additional solutions are not mutually exclusive and can be used as desired by network designers to optimize the network.

Figure 8:
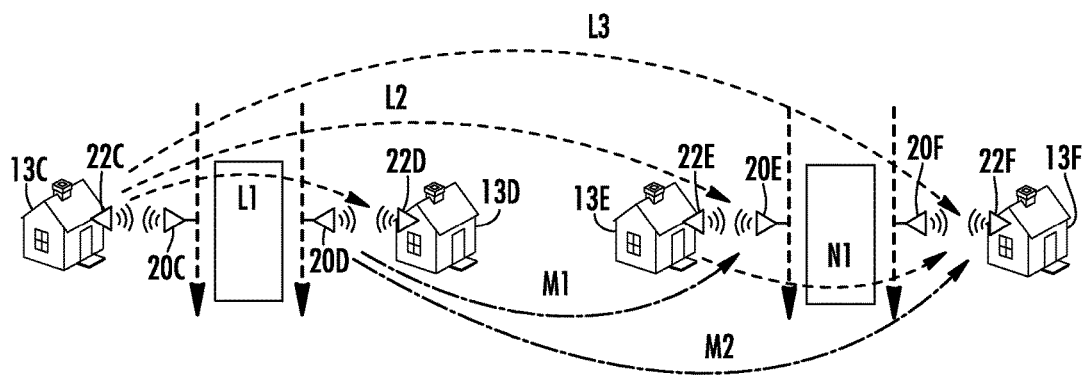
FIG. 8 is a more challenging exemplary diagram illustrating how subscriber unit communications may interfere with one another.
Figure 9:
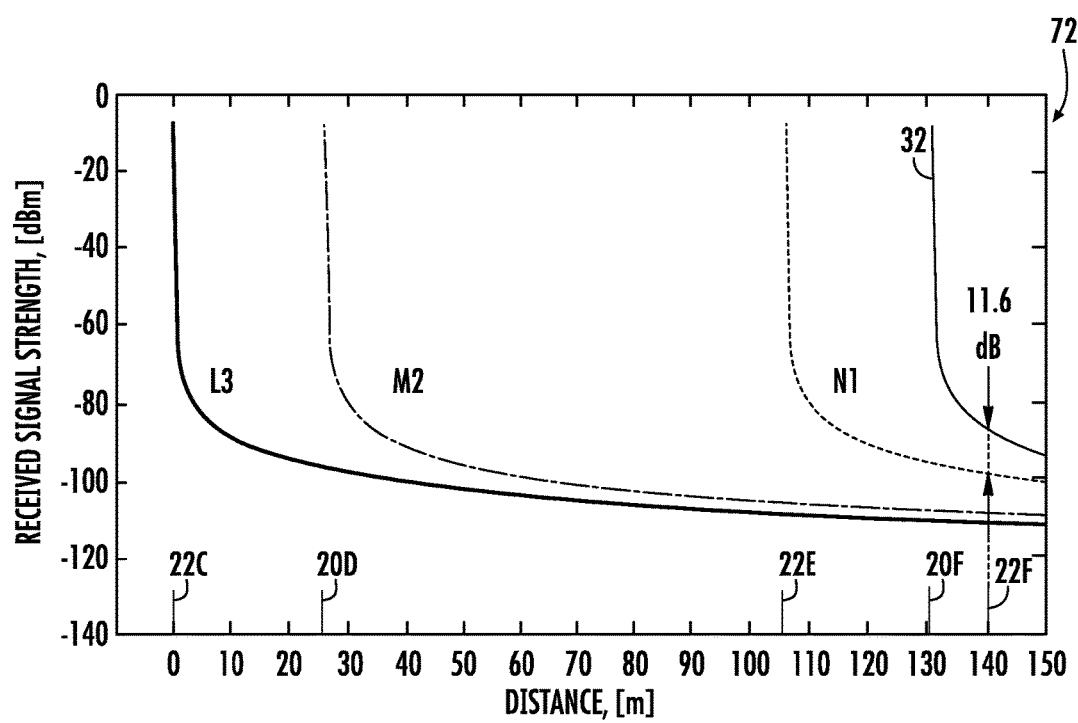
FIG. 9 is an exemplary graph illustrating exemplary interference levels between subscriber units.

FIG. 8 illustrates another interference scenario where several subscriber units 13 are in close physical proximity and mutual interference exists between four subscriber units 13C-13F. The close physical proximity of the subscriber units 13 reduces the effectiveness of beam steering and requires some of the additional solutions alluded to above. However, before introducing such additional solutions, FIGS. 8 and 9 are provided to illustrate the scope of interference that may occur in an exemplary network. As illustrated, signals from antenna 22C may be received by antenna 20C, and extra antennas 22D, 20E, and 22F (signal paths L1, L2, and L3 respectively). Signals from antenna 20D may be received by antenna 22D and extra antennas 20E and 22F (signal paths M1 and M2 respectively). Signals from antenna 22E may be received by antenna 20E as well as extra antenna 22F (signal path N1). While a few particular examples are provided, it should be appreciated that other antennas experience comparable interference.

FIG. 9 illustrates a graph 72 showing calculated received signal strengths for the various signals at antenna 22F assuming the distances as noted and 60 GHz. That is, the signals on interfering signal paths L3, M2, and N1, which are all received by antenna 22F are compared to the basic wireless link 32. In the illustrated example, the difference between wireless link 32 and the signal from signal path N1 is only 11.6 dB in this example. Note further that graph 72 illustrates effective transmission distances. That is, while it is expected that the average length of wireless link 32 will be approximately twenty meters or less, a viable signal may be sent at distances of over one hundred meters. Note that to derive graph 72, propagation loss was calculated from $\alpha_{loss}=(4\pi d/\lambda)^2+\alpha_{air}$, where d is the propagation distance, $\lambda$ is the signal wavelength, and $\alpha_{air}$ is the atmospheric absorption.

Figure 7:
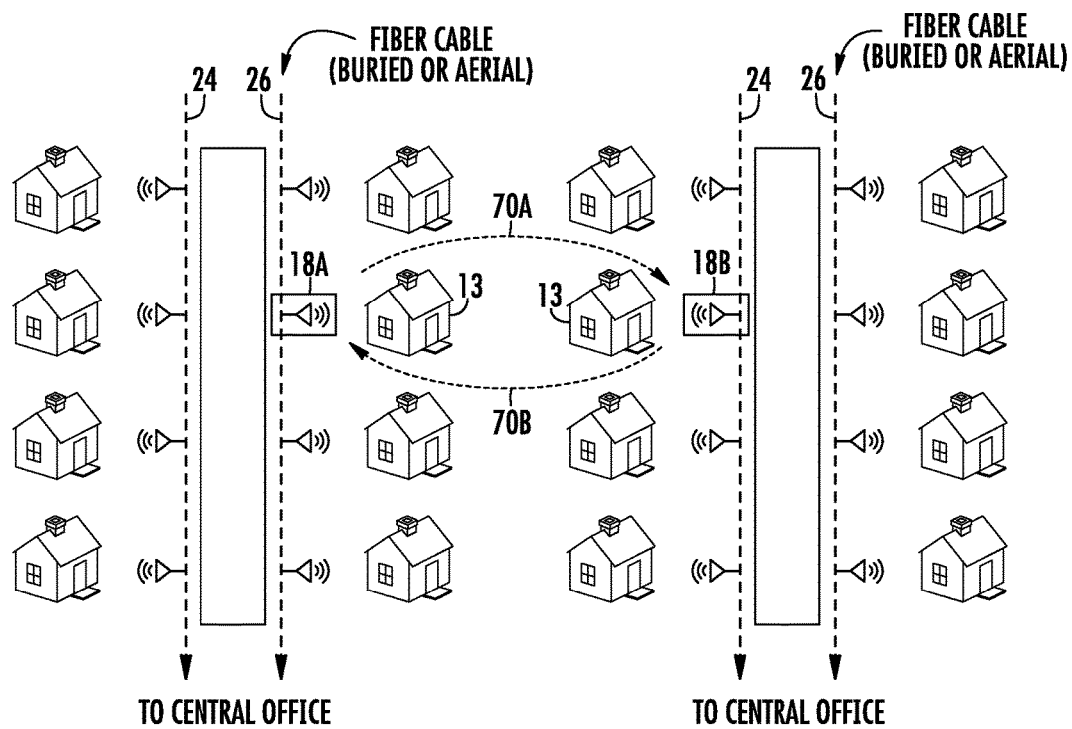
FIG. 7 is a simplified exemplary diagram illustrating how subscriber unit communications may interfere with one another.
Figure 10A:
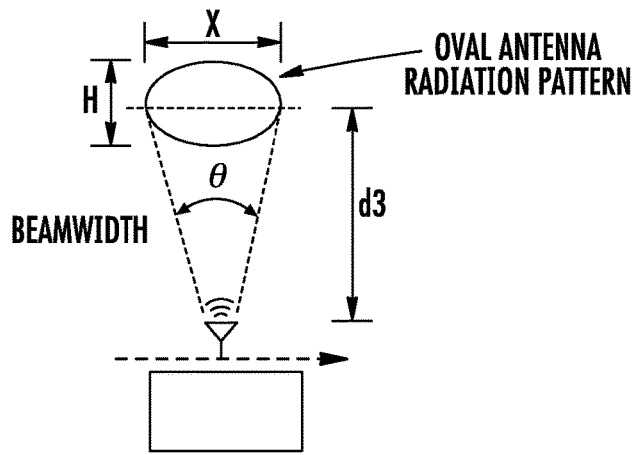
FIGS. 10A & 10B illustrate exemplary structural techniques which may be used to help reduce interference.
Figure 10B:
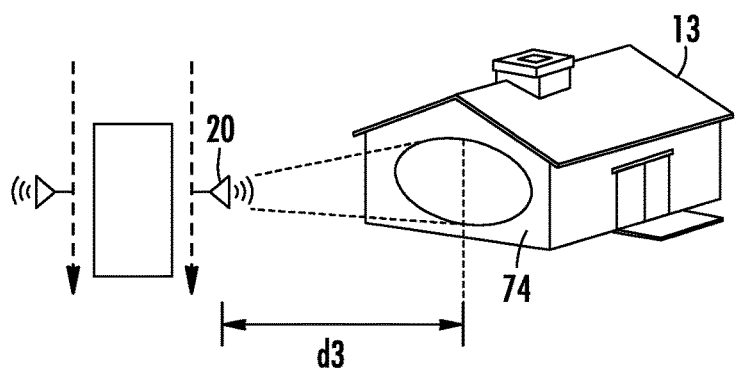

To address the interference illustrated in FIGS. 7-9, a variety of exemplary techniques may be used alone or in conjunction. A first technique is to use the physical structure of the subscriber unit 13 to block the signal. Using the physical structure works because most building materials are opaque to EHF radiation. That is, brick, aluminum siding, concrete, wood paneling, drywall, and other such materials all severely attenuate signals in the EHF. Where there is a reflection from such material, the surface is rarely uniform, so the reflections are severely scattered and lose coherence such that any such reflections do not contribute materially to any interference at another subscriber unit 13. A second technique is to use an oval radiation pattern. The combination of these two techniques is illustrated in FIGS. 10A & 10B. Specifically, FIG. 10A illustrates an oval radiation pattern with θ being the horizontal beamwidth, x being the horizontal cross section, H being the vertical height, and d3 being the distance from the antenna 20 to the antenna 22. The object is to restrict the radiation pattern of the antenna to within the area of a wall 74 as shown in FIG. 10B. This arrangement minimizes unwanted signal radiation from passing around the edges of the subscriber unit 13. The wall 74 also shields the ONU 18 from receiving interfering signals during uplink transmission.

Figure 11:
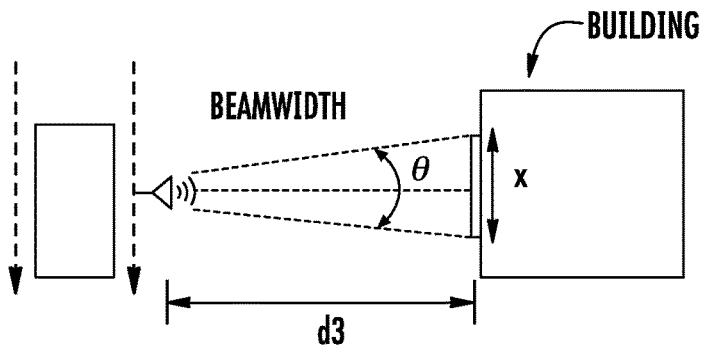
FIG. 11 is another exemplary structural technique which may be used to help reduce interference.

To help illustrate how beam forming and physical structures may be used to reduce interference, FIG. 11 illustrates increasing the directivity (gain) of the antenna 20 such that the majority of the antenna radiation falls within the wall 74. As noted above, building materials such as those incorporated into the wall 74 help block the signals and thus reduce the opportunity for interference. The required minimum cross section length of the wall 74 is given by x=2d*Tan(θ/2), where d (d3 in FIG. 11) is the distance between the antenna 20 and the wall 74, θ is the beamwidth.

Figure 12:
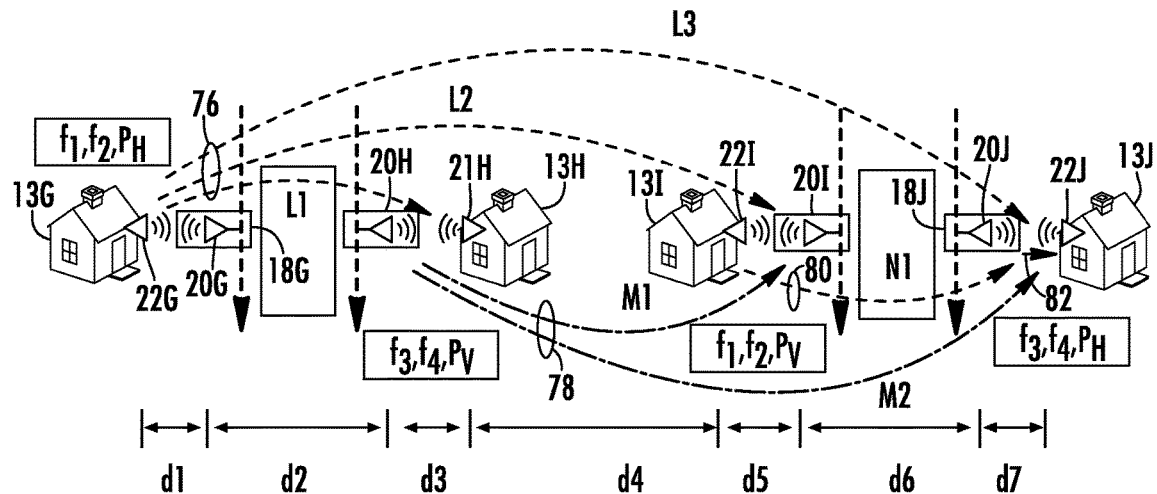
FIG. 12 is an exemplary robust communication scheme in a neighborhood to reduce interference.

FIG. 12 illustrates two additional exemplary techniques for reducing interference within a wireless system and particularly for preventing ONUs 18 from interfering with nearby subscriber units 13 and also for preventing subscriber units 13 from interfering with nearby ONUs 18. In this exemplary embodiment, subscriber units 13G-13J are provided with respective antennas 22G-22J. Corresponding ONUs 18G-18J are also provided. In particular, the signals are frequency division multiplexed and the antennas operate at different polarizations. Thus, the signals 76 intended to go to and from antennas 20G, 22G may occur at f1, f2 and $P_H$ (horizontal polarization), while signals 78 intended to and from the antennas 20H, 22H may occur at f2, f3 and $P_V$ (vertical polarization). Similarly, the signals 80 intended to go to and from antennas 20I, 22I may occur at f1, f2 and $P_V$, while the signals 82 intended to go to and from antennas 20J, 22J may occur at f1, f2, and $P_H$.

Figure 13:
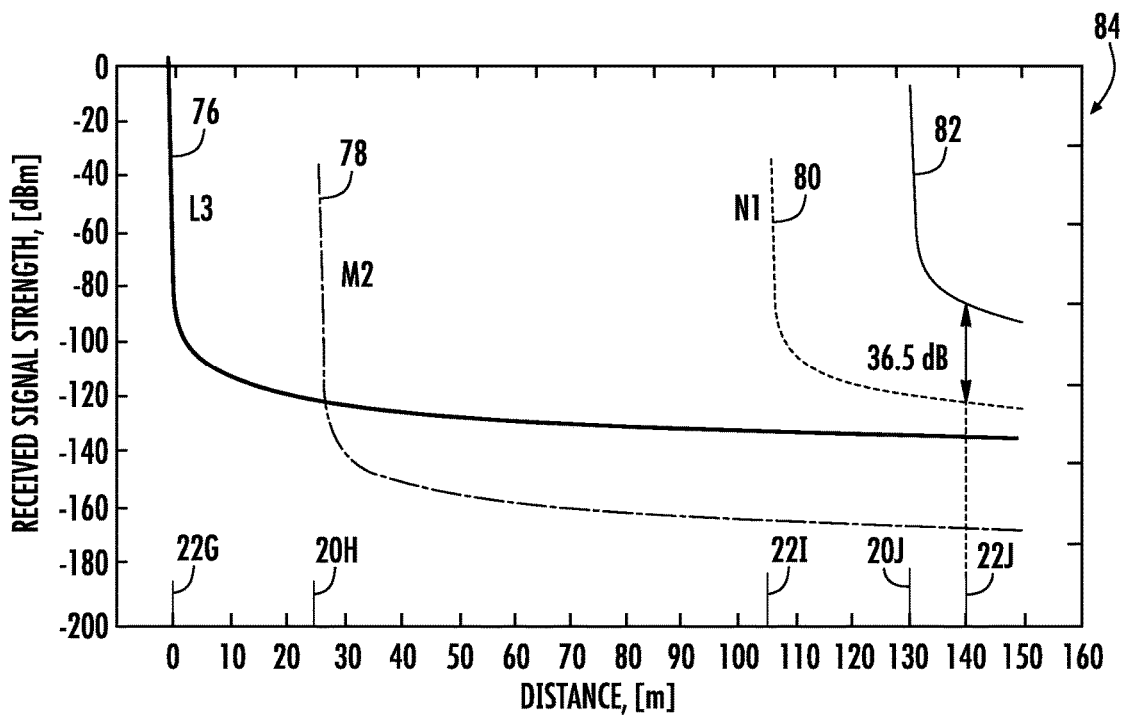
FIG. 13 is an exemplary graph illustrating reductions in interference levels, especially as compared to those set forth in FIG. 9.

Using the techniques set forth with reference to FIG. 12, results comparable to graph 84 in FIG. 13 are possible. As is readily seen, the alternating frequency, and alternating antenna polarization allows the interference to be dropped to 36.5 dB below the desired signal 82. Note that signal blocking was not used in this embodiment. If signal blocking were used, even lower interference levels would be attained.

Thus, as is readily apparent, the present disclosure provides a wireless link from the fiber optical cable on the street to the subscriber unit helping to provide a high bandwidth communications link without the need to secure permission to dig up a subscriber's property to bury a fiber optical cable all the way to the subscriber unit. Likewise, the present disclosure provides a number of techniques to reduce interference from proximate antennas on the same system.

In an exemplary embodiment, the ONU 18 may further include a WiFi component that may be used as a backup communication link in the event that weather or other transient event interferes with the wireless link 32. Circuitry may be provided that detects the status and/or condition of the wireless link 32 and activates the WIFI component accordingly.

Figure 14:
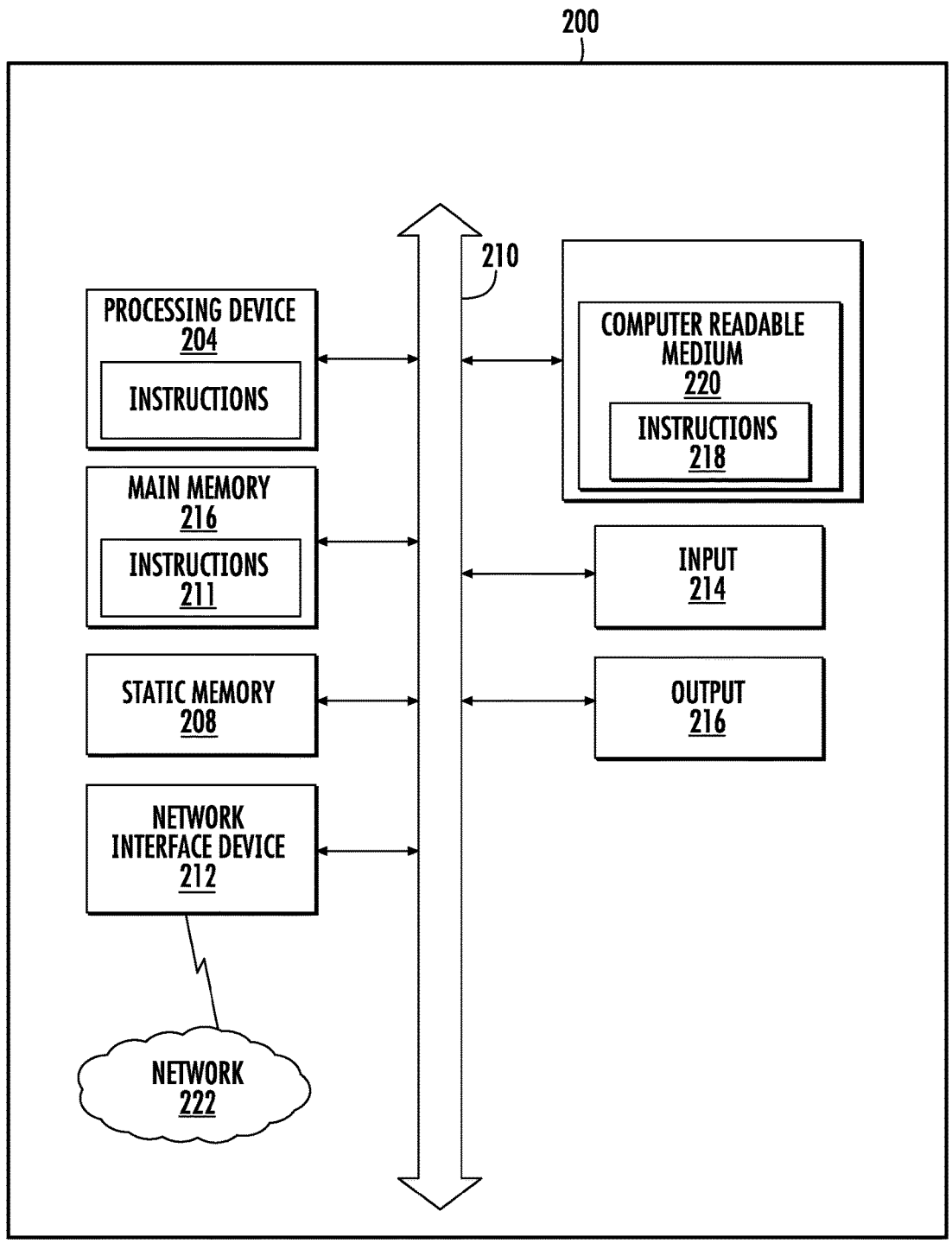
FIG. 14 is a schematic diagram of a generalized representation of an exemplary computer system that can be included in any of the modules provided in the exemplary integrated fiber-wireless systems and/or their components described herein, including but not limited to a head end controller (HEC), wherein the exemplary computer system is adapted to execute instructions from an exemplary computer-readable media.

The ONU 18 or the subscriber hardware 34 disclosed herein can include a computer system. In this regard, FIG. 14 is a schematic diagram representation of additional detail regarding the ONU 18 or subscriber hardware 34 in the exemplary form of an exemplary computer system 200 adapted to execute instructions from an exemplary computer-readable medium to perform power management functions. In this regard, the ONU 18 or subscriber hardware 34 may comprise the computer system 200 within which a set of instructions for causing the ONU 18 or subscriber hardware 34 to perform any one or more of the methodologies discussed herein may be executed. In an alternate embodiment, these methodologies may be implemented on an ASIC. The ONU 18 or subscriber hardware 34 may be connected (e.g., networked) to other machines in a LAN, an intranet, an extranet, or the Internet. The ONU 18 or subscriber hardware 34 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The elements within the ONU 18 or subscriber hardware 34 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 200 in this embodiment includes a processing device or processor 204, a main memory 216 (e.g., read-only memory (ROM), flash memory, dynamic random access memory (DRAM) such as synchronous DRAM (SDRAM), etc.), and a static memory 208 (e.g., flash memory, static random access memory (SRAM), etc.), which may communicate with each other via the data bus 210. Alternatively, the processing device 204 may be connected to the main memory 216 and/or static memory 208 directly or via some other connectivity means. The processing device 204 may be a controller, and the main memory 216 or static memory 208 may be any type of memory.

The processing device 204 represents one or more general-purpose processing devices such as a microprocessor, central processing unit, or the like. More particularly, the processing device 204 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 204 is configured to execute processing logic in instructions 211 for performing the operations and steps discussed herein.

The computer system 200 may further include a network interface device 212. The computer system 200 also may or may not include an input 214 to receive input and selections to be communicated to the computer system 200 when executing instructions. The computer system 200 also may or may not include an output 216, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 218 stored in a computer-readable medium 220. The instructions 218 may also reside, completely or at least partially, within the main memory 216 and/or within the processing device 204 during execution thereof by the computer system 200, the main memory 216 and the processing device 204 also constituting computer-readable medium. The instructions 211 may further be transmitted or received over a network 222 via the network interface device 212.

While the computer-readable medium 220 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including but not limited to dipole, monopole, and slot antennas. The distributed antenna systems or integrated fiber-wireless systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An optical network unit (ONU), comprising:
an optical fiber interface configured to communicate with an optical fiber network;
an optical/electrical converter configured to receive digital optical downlink signals at a first frequency from the optical fiber network through the optical fiber interface and convert the digital optical downlink signals to electrical downlink signals;
electrical circuitry comprising a digital baseband converter, the digital baseband converter configured to frequency convert the electrical downlink signals to digital extremely high frequency (EHF) downlink signals at an EHF; and
a wireless transceiver configured to transmit the digital EHF downlink signals to a proximate subscriber unit associated with a proximate building through an antenna such that the proximate building blocks the digital EHF downlink signals from propagating past the proximate building,
wherein the wireless transceiver is configured to transmit the digital EHF downlink signals using an oval radiation pattern.

2. The ONU of claim 1, wherein the wireless transceiver is configured to restrict the oval radiation pattern of the transmitted digital EHF downlink signals to an area within a wall of the proximate building such that the wall of the proximate building shields the ONU from receiving interfering signals by blocking the digital EHF downlink signals from propagating past the proximate building.

* * * * *